(12) United States Patent
Wielage

(10) Patent No.: US 7,562,244 B2
(45) Date of Patent: Jul. 14, 2009

(54) METHOD FOR DATA SIGNAL TRANSFER ACROSS DIFFERENT CLOCK-DOMAINS

(75) Inventor: Paul Wielage, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 92 days.

(21) Appl. No.: 10/555,747

(22) PCT Filed: May 4, 2004

(86) PCT No.: PCT/IB2004/050581

§ 371 (c)(1),
(2), (4) Date: Nov. 4, 2005

(87) PCT Pub. No.: WO2004/100000

PCT Pub. Date: Nov. 18, 2004

(65) Prior Publication Data

US 2006/0274870 A1    Dec. 7, 2006

(30) Foreign Application Priority Data

May 9, 2003    (EP)    ................. 03101284

(51) Int. Cl.
*G06F 13/42* (2006.01)
*G06F 1/00* (2006.01)
*G06F 3/00* (2006.01)
*G06F 11/00* (2006.01)

(52) U.S. Cl. .................... 713/500; 713/400; 710/52; 714/12

(58) Field of Classification Search ............... 713/500, 713/400; 710/52; 714/12
See application file for complete search history.

(56) References Cited

U.S. PATENT DOCUMENTS

| 5,450,458 | A |   | 9/1995  | Price et al. |
| 5,535,377 | A |   | 7/1996  | Parks |
| 5,602,878 | A | * | 2/1997  | Cross .......................... 375/354 |
| 5,615,327 | A | * | 3/1997  | Magee et al. ................. 714/12 |
| 5,884,100 | A | * | 3/1999  | Normoyle et al. ............ 710/52 |
| 6,163,545 | A |   | 12/2000 | Flood et al. |
| 6,374,365 | B1 | * | 4/2002 | Lahmann ..................... 714/12 |
| 6,516,420 | B1 | * | 2/2003 | Audityan et al. ............ 713/400 |
| 7,219,250 | B2 | * | 5/2007 | Abendroth et al. .......... 713/400 |
| 2002/0194520 | A1 | * | 12/2002 | Johnson ...................... 713/600 |

FOREIGN PATENT DOCUMENTS

| EP | 0590212 A1     | 4/1994  |
| EP | 1124179 A1     | 8/2001  |
| EP | 1124179 B1     | 8/2001  |
| WO | 2004100000 A1  | 11/2004 |

OTHER PUBLICATIONS

Michael Crews, et al: Practical Design for Transferring Signals Between Clock Domains, EDN, vol. 48, No. 4, Feb. 2003, pp. 56-66, 68-71, XP001159987.

* cited by examiner

*Primary Examiner*—Thomas Lee
*Assistant Examiner*—Ji H Bae

(57) ABSTRACT

In a method for data signal transfer across different clock-domains, including synchronization of a data signal with a current clock-domain where said data signal is processed, the processing of said data signal is started before the synchronization of said data signal is completed in said current clock-domain.

5 Claims, 3 Drawing Sheets

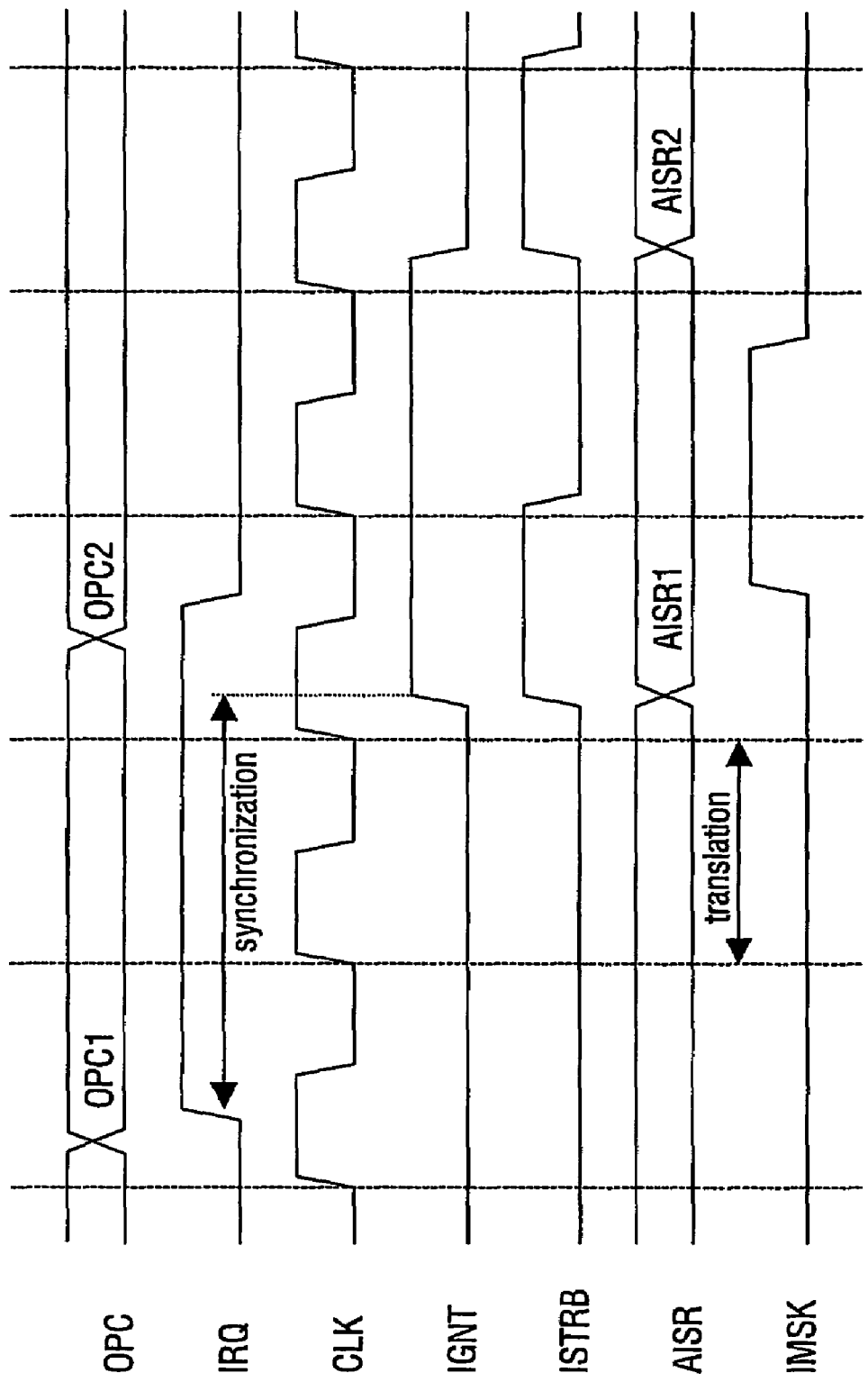

METHOD FOR DATA SIGNAL TRANSFER ACROSS DIFFERENT CLOCK-DOMAINS

FIELD OF THE INVENTION

The present invention relates to a method for data signal transfer across different clock-domains, including synchronization of a data signal with a current clock-domain where said data signal is processed.

BACKGROUND OF THE INVENTION

In future large digital systems, synchronizing a whole chip with a single clock and neglible skew and jitter will be extremely difficult, if not impossible. Hence a single clock chip is relatively expensive. The problem of the global clock approach is that the distribution of the clock over the chip does not tolerate much delay variation since delay mismatch reduces the setup and hold time margins (slack) for longest and shortest paths respectively. A negative slack leads to malfunction of the IC (Integrated Circuit). Delay mismatch in the clock distribution network is called skew if it is caused by design, and jitter if it is caused by on-chip noise. In future process technologies, the delay mismatch must scale down since the delay of gates and flip-flops becomes smaller.

The delay of wires does not scale as transistors do. Hence the delay over long wires on a large IC will not fit any more in a single clock cycle which complicates reaching timing-closure in a design furthermore.

For these reasons, already todays large ICs are partitioned into several clock-domains where each clock-domain spans only a part of the chip area. In a clock domain, all signals are synchronized with the same clock signal. A signal in a clock domain may change only in response to an event on the clock signal, and all of the signals in a clock domain are stable during an aperture time associated with each clock event. Grouping signals into clock domains is advantageous since it allows these signals to be combined using logic circuits and sampled into clock storage elements without further synchronization. Membership in the clock domain is closed under simple composition rules. As long as two signals are in the same clock domain, logical combinations of the signals which do not exceed maximum or minimum delay constrains are in the clock domain. Also, it is always safe (i.e. no probability of synchronization failure) to sample a signal in the clock domain with a clocked storage element driven by the clock signal, and the result of this sampling is also in the clock domain.

However, communication between two clock-domains is not trivial since the frequency and phase relationship of the two clocks is in general nondeterministic. Therefore, inter clock-domain communication requires explicit synchronization, wherein signals from one clock domain must be synchronized to the local clock before they can be used in a different clock domain.

U.S. Pat. No. 5,450,458 A discloses a method and an apparatus wherein data transfer between subsystems of an information handling system employing a multiple subsystem clock environment architecture, or between multiple information handling systems operating with different clock frequencies, is synchronized using a timing aligned multiple frequency synthesizer with a synchronization window decoder. A frequency generation circuit in circuit communication with a data synchronization circuit functions to produce a synchronized timing signal(s) to permit a central processing unit operation in one subsystem clock environment to function with a peripheral subsystem(s), such as a memory controller, operating in a different subsystem clock environment, or permits information handling systems operating with different clock frequencies to function with one another. Data transfer synchronization delays are reduced and mean-time-of-failure of signal synchronization accuracy is increased by eliminating metastability effects from the synchronization circuitry.

In U.S. Pat. No. 5,535,377 A, it is described a method and an apparatus for low latency synchronization of signals having different clock speeds. This method and apparatus are preferably used in systems where a first logic portion operating at a first clock speed, referred to as a fast clock speed, interfaces to a second logic portion operating at a second slower clock speed. A new slow clock is generated pseudo-synchronously from the fast clock using a phase locked loop (PLL) clock generator. The PLL multiplies the fast clock frequency up to the least common multiple (LCM) of the two frequencies to generate a base clock signal. The base clock is then divided down to form the slow clock signal. The PLL performs its operations in such a way that all three clocks have a fixed phase relationship. The rising edges of the base clock, fast clock and slow clock line up at periodic points and are skewed at other periodic points. Fast to slow synchronization logic and slow to fast synchronization logic are included which synchronize signals travelling between the logic portions. In the general case for a first logic portion having a fast clock frequency m and a second logic portion having a slow clock frequency n, the base clock frequency would be the LCM (m, n). The multiplexer in the slow to fast signal synchronization logic used to synchronize slow signals, i.e., signals from the second logic portion, to the faster clock frequency would have baseclock/m inputs. The multiplexor used to synchronize fast signals to the slower clock speed would have baseclock/n inputs.

U.S. Pat. No. 6,163,545 A describes a system for converting data in one clock-domain to a second clock-domain which system comprises a multiplexer having a select control which is synchronous with a first frequency and is coupled to two bistable registers of which a first is clock controlled in accordance with the first frequency and a second is clock controlled by the second frequency. The data output of the first register is looped back to the second data input of the multiplexer. The select signal operates to couple a data input to the first register whereupon the multiplexer then serves to couple the data output of the first register back to the data input thereof. The arrangement ensures availability of data at the first clock frequency beyond a transition of the second clock frequency. Thus data, preferably multi-bit address data, can be transferred from one clock-domain to another with less delay than in customary systems.

In the conventional systems, the incoming data is synchronized before the processing can start. However, this type of synchronization adds a significant amount of delay to the data communication and therefore increasing the latency.

SUMMARY OF THE INVENTION

An object of the present invention is to reduce delay and, thus, to decrease latency.

In order to achieve the above and further objects, according to the present invention, there is provided a method for data signal transfer across different clock-domains, including synchronization of a data signal with a current clock-domain and processing said data signal in said current clock-domain, characterized in that the processing of said data signal is started before the synchronization of said data signal is completed in said current clock-domain.

The method of the present invention results in a reduction of delay and, thus, decreasing of latency, which is very convenient for large integrated circuits partitioned into several clock-domains. The invention can be used in all digital integrated circuits of typical complexity, in particular in the 0.18 μm technology and beyond.

In a preferred embodiment of the present invention, the processing of said data signal is started before or essentially concurrently with the synchronization.

In particular, the synchronization includes at least two intermediate synchronization steps for carrying out the synchronization in the current clock-domain, wherein the processing is started at least before the last intermediate synchronization step has been carried out. The processing can be carried out by at least two intermediate processing steps, wherein the intermediate result of an intermediate synchronization step is used for a predetermined intermediate processing step. Moreover, the intermediate synchronization steps and the intermediate processing can be carried out concurrently, respectively.

The above described objects and other aspects of the present invention will be better understood by the following description and the accompanying figures.

A preferred embodiment of the present invention is described with reference to the drawings in which

BRIEF DESCRIPTION OF THE DRAWINGS

FIG. 5 shows wave forms of several signals which are inputted into and outputted from the synchronization unit of FIG. 4.

DESCRIPTION OF A PREFERRED EMBODIMENT

Data synchronization is typically used for inter clock-domain synchronization. Then, the clocks of two neighbouring clock-domains are derived from either two independent cristal-oscillators or from common cristal-oscillators without any guarantee of the phase between the two clocks (for the sake of minimal design effort).

Figure 1:
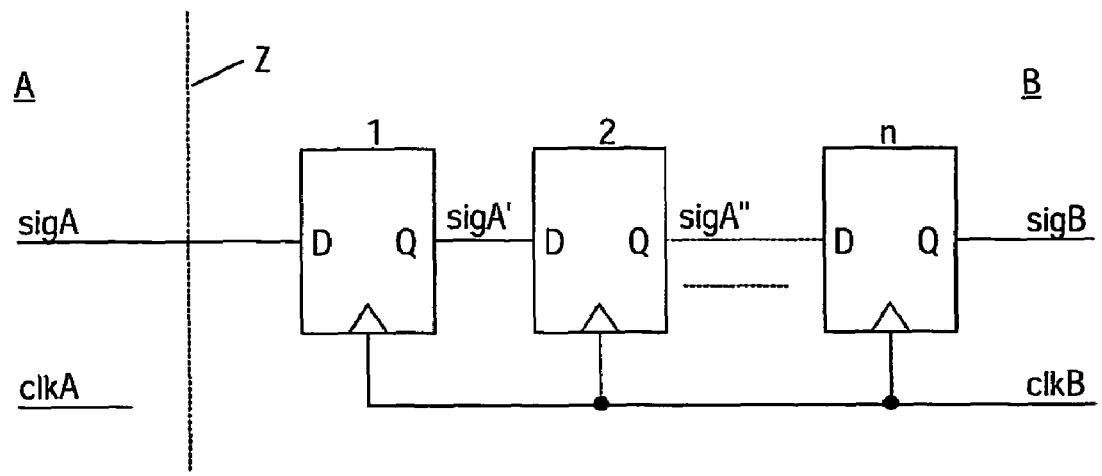
FIG. 1 shows a schematic basic block diagram of a system for data synchronization of a clock-domain crossing signal.

FIG. 1 shows two neighbouring phase-unrelated clock-domains A and B, wherein the clock-domain A can be called the preceding or source clock-domain and the clock-domain B can be called the current or destination clock-domain. In the clock-domain A, as an example a signal sigA is produced which is needed in the clock-domain B. Since the clock-domains A and B are phase-unrelated, the signals crossing the clock-domains A and B must be synchronized before they can be processed in the destination clock-domain B.

In the example of FIG. 1, the synchronization of the clock-domain crossing data signals is accomplished e.g. by n sample elements in series. These sample elements are typically ordinary flip-flops. In FIG. 1, schematically shown is the borderline Z in dotted line between the clock-domain A and the clock-domain B. Further, FIG. 1 shows as an example three D-flip-flops 1, 2 and n of a plurality of n D-flip-flops which are coupled in series and are used for the synchronization. All the flip-flops of each clock-domain are controlled by a common clock signal clk, i.e. in the clock-domain B of FIG. 1 by the local clock signal clkB. In FIG. 1 the signal sigA crosses the borderline Z from the source clock-domain A to the destination clock-domain B and enters the D-input of the first D-flip-flop 1. After having propagated subsequently through all D-filp-flops 1 to n of the clock-domain B of FIG. 1, the signal leaves the clock-domain B as signal sigB.

A sample element captures the state of the incoming signal at every rising clock edge of the receiving clock-domain. A problem shows up, however, when the signal changes state at the instant of sampling. Then, the sampler will run into metastability for a short or longer period of time. During this metastable period, the sampler is deciding whether it saw the old value or the new value on the signal line. As a result of a decision, the output of the sampler changes to its final value. The duration of metastability is undetermined for randomly changing input signals. The probability that a given random transition at the input will result in a synchronisation delay longer than $t_d$ is given by $$P(t_d) = f_{clkB} \cdot t_a \cdot e^{t_d/\tau_s} \tag{1}$$

where $f_{clkB}$ denotes the sample clock frequency, $t_a$ the aperture of the synchroniser, $\tau_s$ the regeneration time constant of the synchronizer. This equation gives the probability of synchronization failure per event to be synchronized (here a transition on sigA). Due to the potential occurrence of metastability for a certain amount of time, the output of the sampler is not in sync with the clock for sure. Then the next sampler in line is required to realize the synchronisation. The probability that this sampler runs into metastability is much smaller but again not zero. Hence, increasing the value of n reduces the rate of synchronization failure at the cost of latency. Increasing the clock rate to improve the synchronization delay is not an option since it is the amount of synchronization time $t_d$ (in nano seconds) that determines the probability of synchronization failure.

The sampling of the signal sigA with the local clock signal clkB present in the clock-domain B as shown in FIG. 1 is, however, not safe because the situation that the signal sigA is changing while it is being sampled by the flip-flop 1 in the clock-domain B is uncertain in terms of value and the settling time.

As the number of clock-domains increases in future process technologies exponentially, the number of clock-domain crossings increases significantly (at least proportional which the number of clock-domains).

Figure 2:
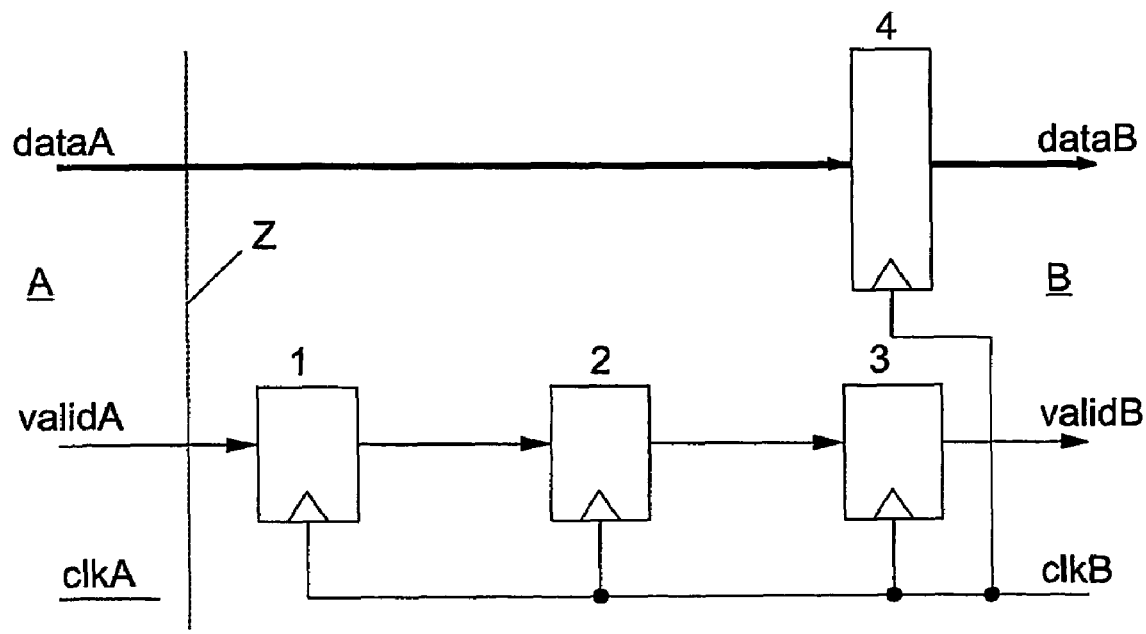
FIG. 2 shows a schematic basic block diagram of a system for data synchronization of a signal bus by means of bundled-signaling.

In case a whole bus of signals is crossing a clock boundary, not every bit of the bus needs to be synchronized. Instead, only one control signal next to the bus needs to be synchronized to indicate production of data. This is called bundled-signalling communication and schematically shown in FIG. 2. According to this concept, every toggle of a valid signal validA produced in the clock-domain A indicates the presence of a new symbol on the data signal data being a vector signal. Since the signal validA is in general not synchronous to the local clock signal clkB produced in the clock-domain B, a couple of flip-flops are required for the purpose of synchronization. In FIG. 2, as an example three flip-flops 1, 2 and 3 are shown. The resulting signal validB is considered to be synchronous to the local clock signal clkB. Further, the concept of FIG. 2 includes a register 4 provided in the clock-domain B. The register 4 is also triggered by the local clock signal clkB and receives the data signal dataA from the clock-domain A at its input and outputs a corresponding data signal dataB which is a vector signal, too, and further processed in the clock-domain B. Yet, a transition on the signal validB indicates a new symbol on the data signal dataB, although two cycles delayed due to the synchronization process.

However, the concept of FIG. 2 does not essentially affect or improve the effective synchronization delay of communication. What the bundle-signalling concept does provide, in addition to cost reduction, is consistency between the bits of the bus. Consistency is a basic property and even more important than synchronization delay.

As explained above, incoming data from another clock-domain is first synchronized before the processing can start. So the synchronisation time is an adder on top of the processing time. In future systems this overhead may have significant impact on the performance as the number of clock-domains increases.

Figure 3:
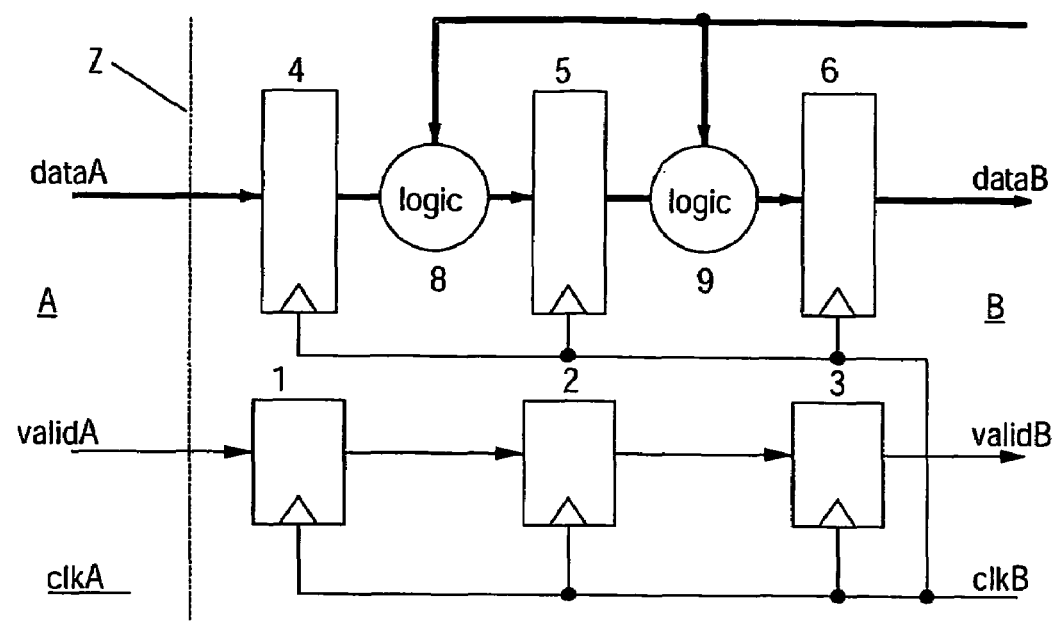
FIG. 3 shows a schematic block diagram of a system for data synchronization of a signal bus by means of bundled-signaling according to a preferred embodiment of the present invention.

FIG. 3 shows an improvement over the concept of FIG. 2 according to a preferred embodiment of the present invention. The circuit schematically shown in FIG. 3 provides a processing on the data signal dataA (coming from the clock-domain A) concurrently with the synchronization of its associated valid signal validA in the clock-domain B.

In the circuit of FIG. 3, computation on the data signal dataA can already start before it is actually synchronized, in contrast to the normal way of employing bundled-signaling. In addition to the circuit of FIG. 2, a plurality of registers (in FIG. 3 three registers 4, 5 and 6 are shown as an example) are placed in the data path of the input bus transmitting the data signal dataA from the clock-domain A to the clock-domain B. These registers are clocked by the local clock signal clkB produced in the clock-domain B, too. During propagation through these registers, pipelined computation can take place concurrently with the synchronization process by means of logic elements which are additionally implemented between the registers in the data path, respectively, and provided for processing on the inputted signal derived from the data signal dataA. In FIG. 3 two logic elements 8 and 9 are shown as an example, wherein the logic element 8 is provided between the registers 4 and 5 and the logic element 9 between the registers 5 and 6. Moreover, in the example of FIG. 3, additional signals (not indicated by characterizing numerals, but depicted as arrows only) are generated in the current clock-domain B and inputted into the logic elements 8 and 9 for the processing function carried out therein.

The processing on the data signal dataA concurrently with the synchronization of its accompanied valid signal validA in the clock-domain B is possible because of the following reason: The valid signal validA and all the bits of the data signal dataA are related since the valid signal validA indicates when the data signal dataA is stable by giving a new symbol (this is called bundled data signaling). So, the valid signal validA must be synchronized only which takes some time. For n synchronization flip-flops, this is between n−1 and n cycles, i.e. in the example of FIG. 3 between the second and third cycles. During the whole interval of synchronizing an event on the valid signal validA to the local clock signal clkB in the current clock-domain B, the data signal dataA contains already the new symbol. A transition on the resulting valid signal validB not only indicates the presence of a new symbol on the resulting data signal dataB right now, but also that this symbol was already present two cycles ago on the data signal dataA (in terms of the local clock signal clkB produced in the current clock-domain B). Giving the presence of such a symbol it is also allowed to process it. Moreover, the synchronization delay is hidden when crossing a clock-domain boundary Z.

The computation is limited to pre-processing only, which means that it can be dependent on the state of the receiving process but not change the state of it. This is logical because the data has not been synchronized successfully, yet.

It is further to be noted, that this circuit also accepts an event from the sending clock-domain before the previous one has been fully synchronized. Hence the production rate of data tokens can be as high as the clock rate of the receiving processor.

Figure 4:
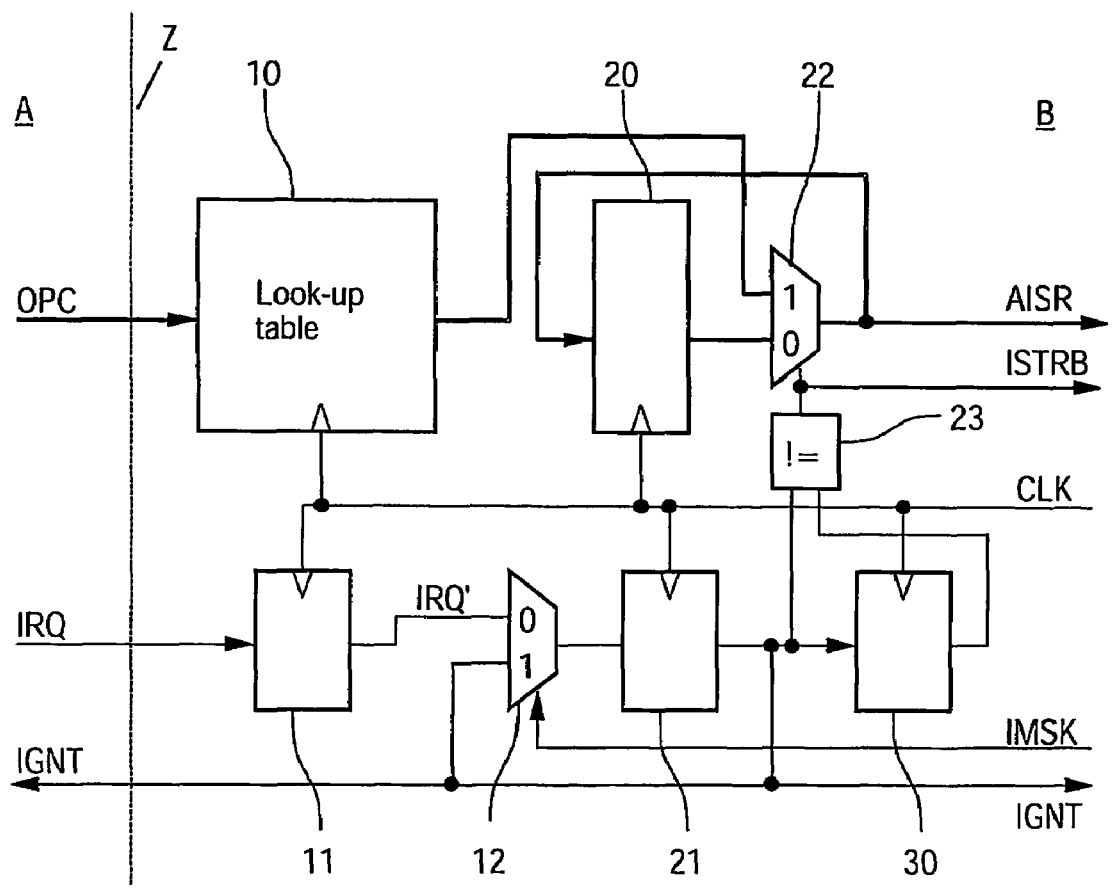
FIG. 4 shows a block diagram of a synchronization unit for interrupts from a different clock domain according to a preferred embodiment of the present invention.

FIG. 4 shows an example of an implementation of a synchronization unit in the current clock domain B for interrupts from the different clock domain A.

This processor interrupt unit comprises a look-up table means 10 which translates an operational code word OPC from a different clock domain A into an address of a service routine, which is carried out in the current clock domain B. The operational code word OPC corresponds to the signal dataA of FIG. 3. The look-up table means 10 is edge-triggered by a local clock signal CLK.

The processor interrupt unit further comprises a first flip-flop 11 which receives a transition sensitive interrupt request signal IRQ also coming from the different clock domain A. This interrupt request signal IRQ corresponds to the signal validA in FIG. 3; a transition on the interrupt request signal IRQ indicates the occurrence of an interrupt where the value of the operational code word OPC gives additional information associated with the interrupt. The first flip-flop 11 is edge-triggered by the clock signal CLK, too, and is provided as a synchronizing means for outputting a semi-synchronized interrupt request signal IRQ'. The semi-synchronized interrupt request signal IRQ' is inputted into a first multiplexer 12 where a fully synchronized interrupt grant signal IGNT is inputted, too. The first multiplexer 12 is triggered by an interrupt mask signal IMSK. The output signal of the first multiplexer 12 is inputted into a second flip-flop 21 which is also edge-triggered by the clock signal CLK. The second flip-flop 21 completes a full synchronization of the interrupt request signal IRQ and outputs the fully synchronized interrupt grant signal IGNT. The interrupt grant signal IGNT is not only inputted into the first multiplexer 12, but also into an exclusive OR gate 23 and a third flip-flop 30. The output signal of the third flip-flop 30 is again inputted into the exclusive OR gate 23. The third flip-flop 30 is also edge-triggered by the clock signal CLK and is provided as a clock cycle delay element. The output signal of the exclusive OR gate 23 is a strobe signal ISTRB which is high for one cycle after the grant of an interrupt request.

The processor interrupt unit of FIG. 4 further comprises a second multiplexer 22 which receives the output signal from the look-up table means 10 and an output signal from a register 20. The second multiplexer 22 outputs an address signal AISR which defines an address of an interrupt service routine corresponding to the operational code word OPC associated with the interrupt request signal IRQ. This address signal AISR is also inputted into the register 20 which is edge-triggered by the clock signal CLK, too.

FIG. 5 shows the wave forms of the above mentioned signals during the occurrence of two consecutive interrupt requests, wherein it is noted that in FIG. 5 the second interrupt request is masked for one clock cycle for the purpose of illustration only.

The processor interrupt unit of FIG. 4 is provided for synchronizing the interrupt signal IRQ and the associated operational code word OPC from the different clock domain to the local clock signal CLK of a processor core (not shown here).

Synchronization of such an interrupt signal IRQ is required when the interrupt is generated in a different phase-uncorrelated clock domain. The interrupt grant signal IGNT and the address signal AISR are the synchronized versions of the interrupt request signal IRQ and the operational code word OPC, respectively.

The interrupt request signal IRQ from the different clock domain A and the fully synchronized interrupt grant signal IGNT obey a two-phase handshake protocol. This means that every transition on the interrupt request signal IRQ indicates a new request and that a grant of a request is indicated by a transition on the interrupt grant signal IGNT and that a new request may only be issued when the previous one has been granted.

A high level on the interrupt mask signal IMSK prevents that any interrupt request affects the control flow of the processor core.

The exclusive OR gate 23 detects transitions on the interrupt grant signal IGNT resulting in a pulse of one clock cycle on the strobe signal ISTRB after a granted request. Under the control of the strobe signal ISTRB, the address signal AISR gets its value from the look-up table means 10 rather than from the register 20. In this way, the address signal AISR holds the address of the service routine which corresponds to the most recently interrupt.

The invention claimed is:

1. A method for a first signal transfer across different clock-domains, comprising the acts of:
   transferring the first signal from a previous clock domain to a current clock-domain;
   receiving a second signal by a first register of the current clock-domain and outputting a semi-synchronized signal;
   providing the semi-synchronized signal and a fully synchronized signal to a multiplexer of the current clock-domain for output of a third signal;
   receiving by a second register of the current clock-domain the third signal for outputting the fully synchronized signal; and
   outputting the first signal synchronized with the current clock-domain using the fully synchronized signal;
   wherein outputting the first signal synchronized with the current clock-domain using the fully synchronized signal includes the acts of:
      providing the fully synchronized signal to a third register for output of an output signal; and
      providing the fully synchronized signal and the output signal to an exclusive OR gate for output of a strobe signal to a further multiplexer for outputting the first signal synchronized with the current clock-domain.

2. An integrated circuit comprising:
   a look-up table for transferring first signal from a previous clock domain to a current clock-domain;
   a first register of the current clock domain for receiving a second signal and outputting a semi-synchronized signal;
   a multiplexer configured to receive the semi-synchronized signal and a fully synchronized signal and output a third signal; and
   a second register of the current clock domain for receiving the third signal and outputting the fully synchronized signal.

3. The integrated circuit of claim 2, further comprising:
   a third register configured to receive the fully synchronized signal and provide an output signal; and
   an exclusive OR gate configured to receive the fully synchronized signal and the output signal and to output a strobe signal to a further multiplexer for outputting the first signal synchronized with the current clock-domain.

4. The integrated circuit of claim 2, wherein the semi-synchronized signal comprises an interrupt request signal and the fully synchronized signal comprises an interrupt grant signal.

5. A method for a first signal transfer across different clock-domains, comprising the acts of:
   transferring the first signal from a previous clock domain to a current clock-domain;
   receiving a second signal by a first register of the current clock-domain and outputting a semi-synchronized signal;
   providing the semi-synchronized signal and a fully synchronized signal to a multiplexer of the current clock-domain for output of a third signal; and
   receiving by a second register of the current clock-domain the third signal for outputting the fully synchronized signal; and
   outputting the first signal synchronized with the current clock-domain using the fully synchronized signal;
   wherein the semi-synchronized signal comprises an interrupt request signal and the fully synchronized signal comprises an interrupt grant signal.

* * * * *